United States Patent Office

3,218,357
Patented Nov. 16, 1965

3,218,357
PROCESS FOR RECOVERING UNSATURATED ALDEHYDES
Otto Roelen, Oberhausen-Holten, and Walter Rottig, Oberhausen-Sterkrade-Nord, Germany, assignors to Ruhrchemie Aktiengesellschaft, Oberhausen-Holten, Germany, a German corporation
No Drawing. Filed June 29, 1961, Ser. No. 142,463
Claims priority, application Germany, July 1, 1960, R 28,247
5 Claims. (Cl. 260—601)

This invention relates to the recovery of unsaturated aldehydes from the reaction products produced in the oxidation of olefins and refers, in particular, to the recovery of acrolein from the reaction products obtained in the oxidation of propylene with an oxygen-containing gas by means of a catalyst. This invention is of particular value in that it provides a practical and economical method for the recovery of unsaturated aldehydes from reaction mixtures containing the same.

The catalytic oxidation of aliphatic olefins with an oxygen-containing gas carried out possibly in the presence of steam results in an unsaturated aldehyde corresponding to the starting olefin, the recovery of which from the products of reaction offers a great number of difficulties. These difficulties are in the main caused by the low concentrations in which the unsaturated aldehydes are present in the overall reaction product. Thus, for example, in the prior art production of acrolein, the effluent gas issuing from the synthesis reactor is generally scrubbed with water in one or more stages; acrolein being soluble in water at room temperature. The concentration of the solutions thereby obtained amounts to about 20%. The resultant solutions are thereafter subjected to distillation, however, as acrolein and water from an azeotrope from which the water must be removed by additional operational steps, the process is neither practical nor economical.

In accordance with the invention, there is provided a process for the recovery of unsaturated aldehydes and particularly acrolein applicable to the reaction products obtained in the catalytc oxidation of olefins and propylene, respectively, with gases containing oxygen, which avoids the disadvantages heretofore associated with the known recovery procedures.

According to the present invention, the gases and vapors recovered in the oxidation are freed from the bulk of water contained therein by condensing the gaseous reaction mixture in a single-stage or multi-stage condensation, and the unsaturated aldehydes are thereafter separated from the gaseous reaction mixture by scrubbing with branched-chain hydrocarbons having from 6 to 20 carbon atoms, and preferably from 9 to 15 carbon atoms in their molecules, at temperatures of between 0 and —70° C., and preferably between —10 and —50° C. The pure unsaturated aldehydes are recovered from the scrubbing liquors by distillation.

When the process of the invention for the recovery of unsaturated aldehydes is carried out, the products resulting from the oxidation procedure, as for example acrolein, are substantially quantitatively isolated from the effluent gases of the catalytic olefin oxidation. This highly advantageous result stems from the fact that only small amounts of water are separated out in the scrubbing operation as the lower phase, the same being substantially free of unsaturated aldehydes, and consequently a very pure, and practically water-free, unsaturated aldehyde product is recovered when the scrubbing liquors are subjected to distillation.

The process of the invention is preferably carried out as hereinafter described. The bulk of the water is first removed from the exit gases from the reaction zone by condensation effect in one or several stages. Most advantageously, the major portion of the water is removed from the effluent gases by condensation in a first stage at a temperature of between 50 and 80° C., and subsequently in a second stage further amounts of water to account for substantially all of the water present in the exit gases are removed at a temperature of between about 15° and 40° C. Under these conditions considerable amounts of aldehyde are not dissolved in the water and are not accordingly separated out in the form of aqueous solutions. The gas in accordance with the invention is subsequently passed through a single-stage or multi-stage scrubbing unit in which branched-chain aliphatic hydrocarbons are employed as the scrubbing agent. The hydrocarbon solvent or scrubbing agent contains between 6 and 20 carbon atoms and preferably between 9 and 15 carbon atoms in its molecule. It has been found that as high a degree of chain branching as is possible in the hydrocarbon washing agent increases the efficiency of the agent for the purposes of the invention. Straight-chain hydrocarbons, while usable, are not as suitable as scrubbing agents as branched hydrocarbons. There may be preferably used, isooctane, trimeric propylene, and tetrameric propylene. The hydrocarbon washing agent may be used in its hydrogenated, non-hydrogenated or partially-hydrogenated state. The temperatures used in the scrubbing operation should lie below 0° C. and preferably below —10° C., the most favorable range being from about between —20° to —50° C.

The scrubbing operation is effected advantageously in a plurality of stages using temperatures of, for example, between —10° and —20° C. in the first stage and thereafter decreasing the temperature to about —20° to —40° C. and, if desired, even further to —40° to —70° C. in subsequent stages. Under such conditions substantially complete recovery of the unsaturated aldehyde present in the reaction gas is achieved as any residual water still present in the gas being subjected to the low temperature scrubbing operation is substantially completely obtained as the lower phase in the first scrubbing stage and may be separated off easily, substantially no further water being present in the subsequent stages. The small amounts of water separated out in the first stage do not solidify due to the presence therein of a minor amount of aldehyde so that plugging or crystallizing out in the conduits does not occur.

The unsaturated aldehyde, as for example acrolein, is recovered from the scrubbing liquors by distillation directly in a high degree of purity at the theoretical boiling point. The degree of purity in the usual run is in excess of 97%; in the instance of excellent cutting columns, the degree of purity is in excess of 99% and frequently lies between 99.5% and 99.8%. The small amounts of the aldehyde-containing aqueous phase recovered in the scrubbing are preferably processed separately, as for example by distillation or extraction. It may be necessary to remove small amounts of water from the aqueous phase by drying prior to such processing.

A further advantage of the process of the invention resides in the fact that substantially complete recovery of the unreacted olefin present in the residual gas, as for example propylene and propane, is possible, especially if a commercial propylene-propane mixture is used for the oxidation.

In accordance with the invention, the low molecular weight olefinic feed hydrocarbons are substantially quantitatively dissolved in the scrubbing liquor from which they may be recovered by distillation thereof under gentle heating with the use, if desired, of a low-temperature column and, most advantageously, in heat exchange relation with the exit gas to be scrubbed. The recovered olefin may thereafter be re-cycled for use in the oxidation process. However, in case of high conversion rates of propylene, the olefin content of the $C_3$ fraction is so low that re-cycling of the unconverted olefin obtained from the scrubbing to the oxidation zone is uneconomical and can be dispensed with. The gas may, however, be employed for other purposes.

The method of the invention may be carried out at atmospheric pressure, reduced pressures or supra-atmospheric pressure and is preferably effected under the pressure at which the oxidation synthesis is carried out, namely, at a pressure of between 1 and 10 kg./cm.$^2$, and preferably 1 and 5 kg./cm. absolute.

The scrubbing liquors after distilling off the unsaturated aldehyde may be re-cycled to the washing stages. After repeated use, the scrubbing agent contains varying amounts of high-molecular weight oxidation products, the nature and amount of the product depending upon the operational conditions of the oxidation. In such case processing of the entire scrubbing liquor by distillation may be necessary. The hydrocarbon washing agents may, of course, thereafter be re-cycled immediately into the scrubbing cycle. The process of the invention can be carried out with exit gases from the oxidation of olefinic compounds such as propylene, butene, isobutylene, pentene, methyl butene, cyclopentene, and cyclohexene.

The following example illustrates the way the process may be carried out in practice but is not to be construed in limitation thereof:

*Example*

250 ml. of a catalyst consisting of 7.1% by weight $MoO_3$, 8.4% by weight of $Bi_2O_3$ and 84.5% by weight of silica is introduced into a quartz tube 110 cm. in length and having an inside diameter of 20 mm. The catalyst is prepared by combining the corresponding amounts of technical grade (85%) molybdic acid and bismuth nitrate $(Bi(NO_3)_3)$ and $5H_2O$. The silica which is used is a product known under the trade name of "Aerosil unpressed." The entire catalyst batch is thereafter acidified with a small amount of nitric acid, kneaded until complete homogeneity is achieved and applied in a thin layer (5 to 6 mm.) to metal plates, and is thereafter dried for 24 hours at a temperature of 105 to 110° C. The catalyst is then activated by heating to 300° C. within 60 minutes, being maintained at this temperature for 30 more minutes. The mass is then allowed to cool and is crushed; a sieve fraction of 2 to 5 mm. particle size being separated for further use.

Air which has been passed through a water saturator adjusted to a temperature of 66° C. is passed over 250 ml. of this catalyst at a rate of 50 liters/hr. A propylene-propane mixture containing about 60% propylene is introduced into the reactor immediately before the entering of the gas into the furnace, the rate being 4 liters/hr. based on propylene. The oxidation is effected at a temperature of about 400° C.

The reaction mixture leaving the reactor is condensed by means of an air-cooled condenser after which there is arranged a water-cooled condenser. On passing therethrough, substantially the entire water present in the reaction gas mixture is separated out. The acrolein content of the condensed water amounts to about 1%.

The water-free reaction gas is then passed through 2 series-connected low-temperature traps, the first of which is maintained at —20° C. and the second at —50° C. The traps contain tetrameric propylene which has been hydrogenated with a nickel catalyst prior to its introduction into the traps for use as a scrubbing agent.

When the combined scrubbing liquors from the two scrubbing stages are processed by fine fractionation, after separation of a small amount of water from the first stage in which, however, only relatively small amounts of acrolein are found, the reaction product obtained consists of about 5.0% of acetaldehyde, about 93% of acrolein, and about 2% of acrylic acid. Based on the total reaction products present in the residual synthesis gas (not including carbon monoxide and carbon dioxide), the scrubbing efficiency amounts to 97–98%. The saturation of the first stage is 15% and that of the second stage about 12%.

If non-hydrogenated tetrameric propylene is used instead of hydrogenated tetrameric propylene, substantially the same results are obtained (temperature of the second stage, —60° C.).

When isooctane is used in place of tetrameric propylene and with a load of about 9% in the first stage and a load of about 8% in the second stage, an efficiency of 95–96% based on the total reaction products present in the tail gas (not including carbon dioxide and carbon monoxide) is obtained (temperature of the second stage, —65° C.).

The use of commercial grade trimeric propylene in hydrogenated and non-hydrogenated state produces substantially no difference in results as compared with the values obtained when tetrameric propylene is employed. The efficiency ranges between 98 and 99%. The temperature of the first stage in this instance is —15° C. and that of the second stage —65° C.

When using a $C_8$–$C_{11}$ fraction (non-hydrogenated) which is derived from the Fischer-Tropsch synthesis and contains substantially no oxygenated compounds, having an olefin content of about 55%, a load of 7% is found in the first stage and one of 8% in the second stage. The efficiency in this instance amounts to 91 to 92% (temperature in the first stage —25° C. and in the second stage —55° C.).

We claim:

1. A process for the recovery of an unsaturated aldehyde selected from the group consisting of acrolein and methacrolein from a gaseous reaction mixture produced in the catalytic oxidation of propylene and butylene respectively, which comprises cooling the gaseous reaction mixture whereby substantially all of the water contained in such gaseous reaction mixture is condensed, and separated out, thereafter scrubbing the gaseous reaction mixture using as scrubbing agent a branched-chain aliphatic hydrocarbon having from 6 to 20 carbon atoms in its molecule at a temperature of from 0 to —70 degrees C. and recovering the unsaturated aldehyde from the scrubbing liquid by distillation thereof.

2. Process according to claim 1 wherein said cooling is effected in a first stage at a temperature of between 50–80 degrees C. and in a second stage at a temperature of between about 15–40 degrees C.

3. Process according to claim 1 wherein said scrubbing is effected in a first stage at a temperature of between —10 and —20 degrees C. and in the second stage at a temperature of about —20 to —40 degrees C.

4. Process according to claim 1 wherein the scrubbing agent used in said scrubbing prior to said distilaltion for recovery of aldehyde therefrom is subjected to a low temperature distillation for recovery of unreacted olefin.

5. Process according to claim 1 wherein said distillation is effected at a pressure of between about 1 and 10 kg./cm.$^2$.

References Cited by the Examiner

UNITED STATES PATENTS

| | | | |
|---|---|---|---|
| 2,606,932 | 8/1952 | Cole et al. | 260—604 |
| 2,791,550 | 5/1957 | West et al. | 202—39.5 |
| 2,941,007 | 6/1960 | Callahan et al. | 260—604 |

FOREIGN PATENTS 588,908  12/1959  Canada.

LEON ZITVER, *Primary Examiner.*